June 15, 1937.  C. I. GESELL  2,083,948
WEIGHING SCALE
Filed June 27, 1934
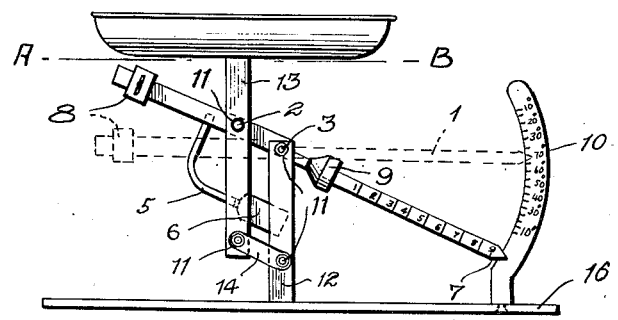
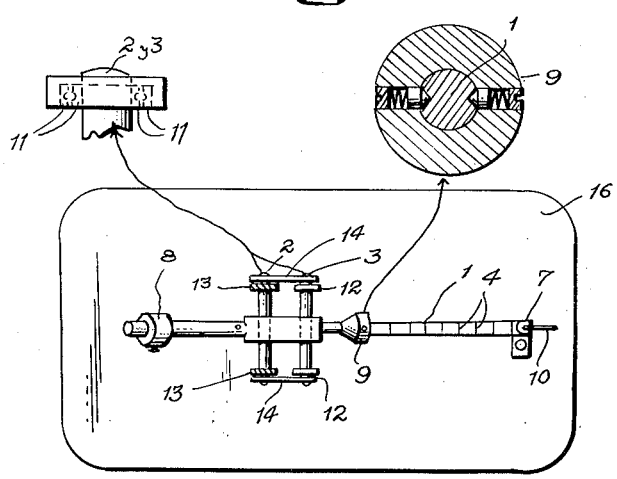
INVENTOR.
C. I. Gesell
BY Marks & Clerk
ATTORNEYS.

Patented June 15, 1937

2,083,948

UNITED STATES PATENT OFFICE 2,083,948

WEIGHING SCALE

Carlos Idaho Gesell, Buenos Aires, Argentina

Application June 27, 1934, Serial No. 732,717
In Argentina July 19, 1933

2 Claims. (Cl. 265—61)

This invention relates to a new weighing scale, preferably used for weighing babies, or for general industrial and commercial purposes, hand operated for weight units and automatic for fractions thereof.

The object of the present invention is to provide a simple, solid and economical weighing scale, provided with an oscillating beam (1) which by means of a sliding weight (9) indicates the units of weight, and simultaneously with the end (7) of said balance beam indicates automatically the fractions of said units of weight.

This weighing scale is based on the use of a balance beam (1) forming two uneven arms which are maintained in equilibrium by means of a main weight (6) rigidly secured to said balance beam (1) by means of the arm (5). This weight (6) lowers the center of gravity of said balance beam (1) to a plane substantially lower than that of its axis of oscillation (3).

A sliding weight (9) provided with two spring actuated wedges or the like, rests on the balance beam (1), said spring actuated wedges fitting in the notches (4) of the balance beam, the sliding weight (9) thus indicating the units of weight, while the fractions thereof are indicated by the pointer (7) at the end of the balance beam on the quadrant (10).

In order that the invention may be more clearly understood, same has been illustrated, by way of example, in one of the many manners in which it may be carried into practice, in the accompanying drawing, wherein:

Figure I is a front view of the weighing scale, showing the position taken by the balance beam, when there is no load on the scale, the pointer 7 indicating "0" on the graduated quadrant 10, while the sliding weight marks "0" on the beam, the weight 6 being at its lowest position.

Figure II is a top view of the weighing scale, to more clearly show the simplicity of its mechanism.

The weighing scale illustrated comprises a balance beam 1 having a pointed end 7 which forms the needle of the pointer. Two cross pins 2 and 3 are provided near the middle portion of the balance beam 1, the pin 2 serving to receive and hold the supports 13 for the pan 15, by means of ball bearings 11, while the pin 3 rests in the bearings 11 of the supports 12, these bearings serving as pivots for the balance beam in the vertical oscillation thereof in front of the quadrant 10. The check links 14 serve to hold the supports 12 and 13 in parallel position.

The portion of the balance beam 1 forming the pointer, is provided with a plurality of equidistant notches 4, in order that the spring actuated wedges of the weight 9 will fit therein to bring the sliding weight to an exact predetermined position, and these notches are numbered, the units of weight being indicated by the relative position of the sliding weight on the balance beam.

An arm 5 secured to the end of the balance beam opposite to the pointer 7, and preferably following a semi-circle below the balance beam 1, is provided with a main weight 6 which lowers the center of gravity of the balance beam 1.

A slidable register 8, secured by means of a screw to the end of the balance beam 1 opposite to 7, serves to compensate the balance beam.

A graduated quadrant arranged suitably near the pointer 7, serves to read the fractions of weight units.

The bearings 11 are preferably of the ball bearing type in order to reduce friction to a minimum and increase sensibility, and maintain the leverage constant whatever the inclination of the balance beam may be. The center of gravity of the sliding weight 9 during the entire length of its travel on the beam should lie normally in the same plane as the pivots 2 and 3. It is obvious that any other type of bearings may be used for example common pins or roller bearings.

Two vertical supports 12 secured to a base 16, support the balance beam 1 by means of the corresponding pivots 3.

Two supports 13 hold the pan 15 and transmit the weight placed on said pan 15 to the balance beam 1 by means of the pin or pivot 2, mounted in the corresponding bearings 11. To insure a more efficient operation, said supports 13 act vertically and parallel to the supports 12 and are joined at their lower end by means of plates 14 and links having corresponding pins and ball bearings 11 equidistant to 2 and 3 to maintain the parallelism and in order that the weight may be transmitted vertically from the pan 15 to the balance beam 1.

The operation of the weighing scale is as follows:—Upon loading the pan 15 with a weight lower than the units indicated by the weight 9 in the notches 4, the balance beam 1 will move together with the weight 9 and automatically indicate the weight on the graduated quadrant 10, by means of the pointer 7.

If the weight on the pan 15 is larger than the units indicated by each notch 4, the weight 9 is moved until the pointer 7 of the balance beam 1 reaches the quadrant 10, the units of weight being indicated by the weight 9 in front of each notch 4, while the fractions are shown by the pointer 7 on the quadrant. If desired, a damper may be provided with this scale.

It is evident that in carrying this invention into practice, same is capable of suffering modifications, provided same come within the scope of the appended claims.

What I claim is:—

1. In a weighing scale, a quadrant having indications thereon of fractional parts of the unit in which the scale measures the weight, a stationary support, a scale beam pivoted on said support and having a pointer to indicate values on said quadrant, an adjustable weight on one arm of said beam, a scale pan, a floating support for said scale pan pivoted to said scale beam on the arm opposite the adjustable weight, a unit scale on the first mentioned arm, said adjustable weight and scale being adapted to counterbalance and indicate the units of weight in the pan, a main weight rigidly suspended from said beam, whereby the balance beam is kept in equilibrium, keeping the center of gravity of the units weight in the axis of the beam and maintaining the first mentioned arm on the quadrant to indicate the fraction of a unit of weight.

2. The device as claimed in claim 1, in which a link parallel to the beam is pivotally connected to the fixed support and to the lower portion of the stationary support.

CARLOS IDAHO GESELL.